United States Patent [19]

Handy

[11] 4,378,571
[45] Mar. 29, 1983

[54] SERIAL ANALOG VIDEO PROCESSOR FOR CHARGE COUPLED DEVICE IMAGERS

[75] Inventor: James E. Handy, Long Beach, Calif.

[73] Assignee: Xerox Corporation, Stamford, Conn.

[21] Appl. No.: 280,620

[22] Filed: Jul. 6, 1981

[51] Int. Cl.³ .................... H04N 5/14; H04N 3/14; H04N 5/20
[52] U.S. Cl. .................................. 358/213; 358/160
[58] Field of Search ............... 358/160, 166, 167, 163, 358/168, 212, 213, 184, 174, 283, 284, 293, 294, 181-183

[56] References Cited

U.S. PATENT DOCUMENTS 3,598,908  8/1971  Poulett ............................... 358/182
4,038,690  7/1977  Hoagland ........................... 358/213
4,225,883  9/1980  Van Atta et al. ................ 358/213 X Primary Examiner—Robert L. Richardson
Attorney, Agent, or Firm—Robert E. Cunha

[57] ABSTRACT

A circuit for stitching and balancing the outputs of two CCD arrays is described. The field of view of a high resolution CCD raster input scanner can be doubled by using a CCD array for each half of the scan. Then the CCD output analog pulses must be stitched together, the dc level equalized and restored to a common value, and the gains adjusted to match the video levels from the two CCD devices. The circuit described herein accomplishes these functions at high data rates and at low cost by stitching the video, eliminating the hold step produced by the sample-and-hold circuit, and adjusting the gains, all at the low voltage levels at which the CCD output signals were originally produced, before amplifying the resultant stitched video to a higher voltage level and converting to digital form.

9 Claims, 4 Drawing Figures

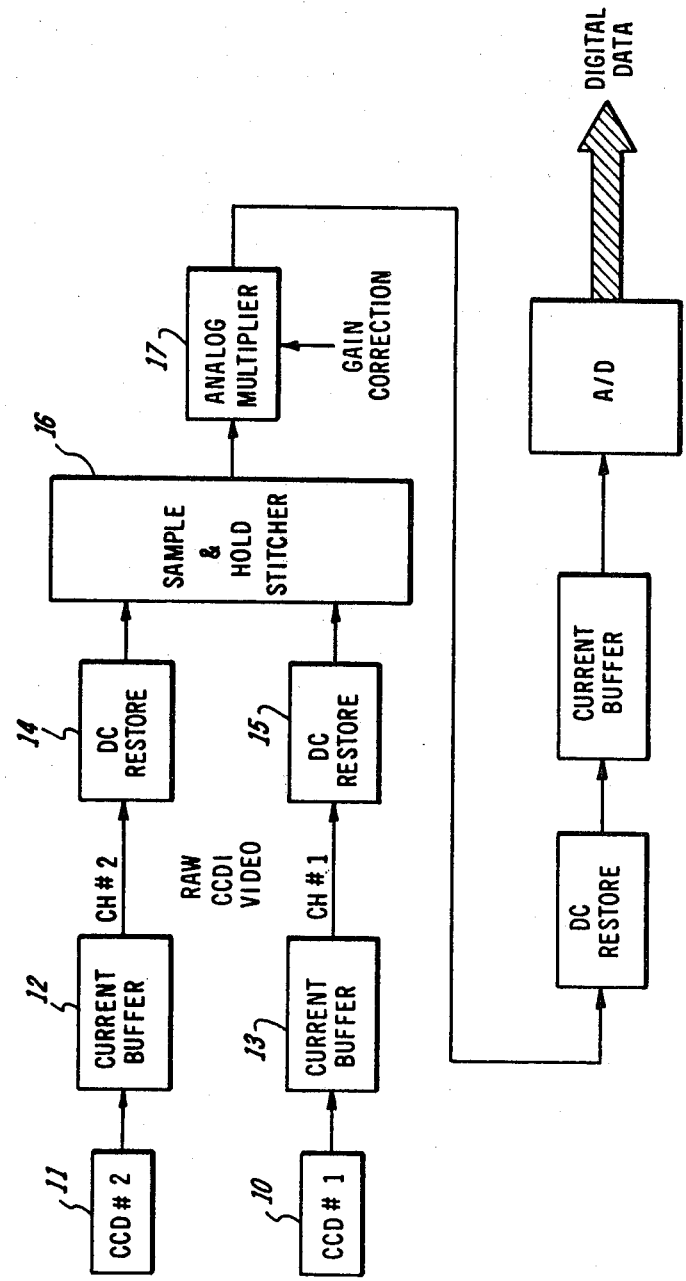

SERIAL ANALOG VIDEO PROCESSOR FOR CHARGE COUPLED DEVICE IMAGERS

This invention is a circuit for matching the output of two CCDs in a raster input scanner.

In copying systems, CCD raster input scanners are used to convert reflected light from an original into a series of pixels (picture elements), each pixel comprising an analog voltage pulse. These pulses may range from 50 to 120 millivolts in amplitude and occur at a rate of about eight million pixels per second. The pulses are typically processed digitally into halftone dots for printing.

Office quality copies require very good detail, which results from high resolution. This resolution can be maintained over a large field of view by using two CCD arrays per scan, one for the first half of the scan and the second for the second half, and then "stitching" together the CCD outputs to form a single high resolution scan.

However, CCDs are not uniform in their output pulse amplitude and dc levels. The stitching circuit, then, must adjust the various gains so that the corresponding page halves appear identical to the user.

One straightforward method of stitching the outputs would be to provide each CCD output with a circuit comprising a sample and hold circuit and an amplifier to increase the small signals to a working level, convert each analog pulse to a digital signal and then combine the two digital signals to form the final video data stream. To compensate for a difference in CCD output levels, each amplifier would have to be adjustable.

The above requires two analog to digital converters. One can be eliminated by providing each CCD with a sample and hold circuit and an amplifier, and adding together the analog signals to create the video. The mixer output can then be converted to digital form. This still requires separately adjustable amplifiers.

The problem is to reduce the parts count still further while maintaining the high data rates necessary to run modern office systems. The circuit described herein provides this capability by using a current amplifier and dc restorer for each CCD array, and then combining the two bit streams in a "sample and hold stitcher". The stitched output is then amplified in a circuit which accepts a two level compensation signal, which matches the outputs. The result is a mixing that takes place at a prior low-level stage rather than a later high-level stage, thereby using fewer components at lower cost, while maintaining high data rates.

In fact, the circuit described herein is not limited to processing CCD output signals. Any two continuous analog voltages may be sampled and smoothly joined using this circuit.

This circuit will be explained in relation to the following diagrams:

FIG. 1 is a block diagram of the circuit.

Figure 2A:
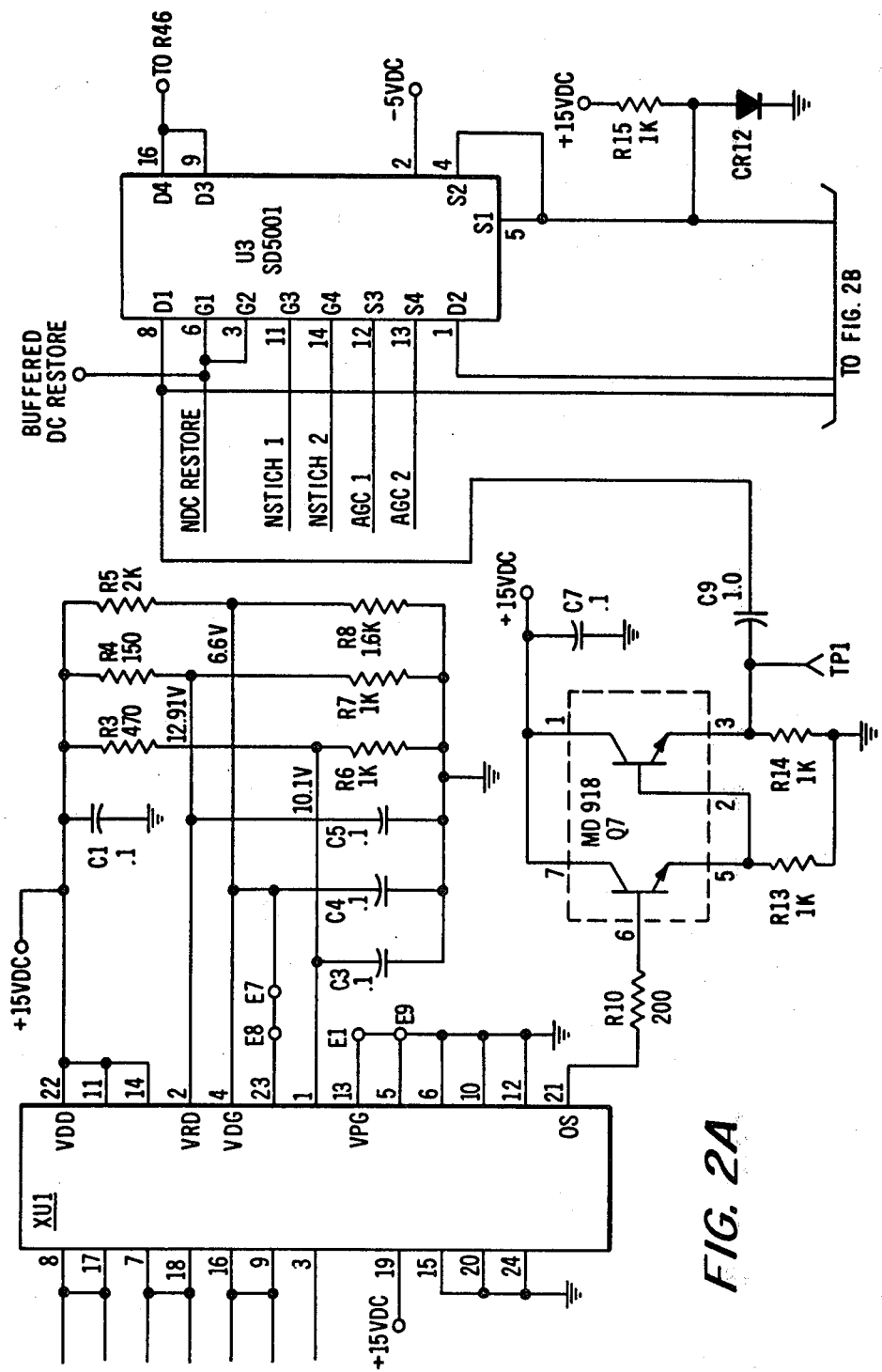
FIG. 2 is a schematic diagram of the CCD and Sample and Hold Stitcher portions of the circuit.

As shown in FIG. 1, there are two CCD arrays 10, 11 the outputs of which are analog video pulses, each about 120 nanoseconds in duration, riding on a dc level of several volts. The dc levels and analog video pulse amplitudes can vary up to ±10% from one chip to another. High bandwidth dc coupled current buffers 12, 13 lower the signal impedance, and dc restore circuits 14, 15, which consist of series capacitors and ancillary circuitry, block the dc level of the particular CCD chip and current buffers to allow the analog video pulse information to be referenced to a known dc level. In the sample and hold stitcher 16, the two video pulse trains are stitched, and a hold step cancellation signal is produced. The hold step is an undesireable side effect caused by the circuits leakage capacitances. This hold step becomes very prominent when sampling low level signals at high speeds. Both of these signals are applied to the analog multiplier 17 which subtracts the hold step from the video and balances and matches the gain factor for channels 1 and 2. Finally, the stitched and balanced video is dc restored to a zero volt dc level, buffered and converted to a digital signal.

Figure 2B:
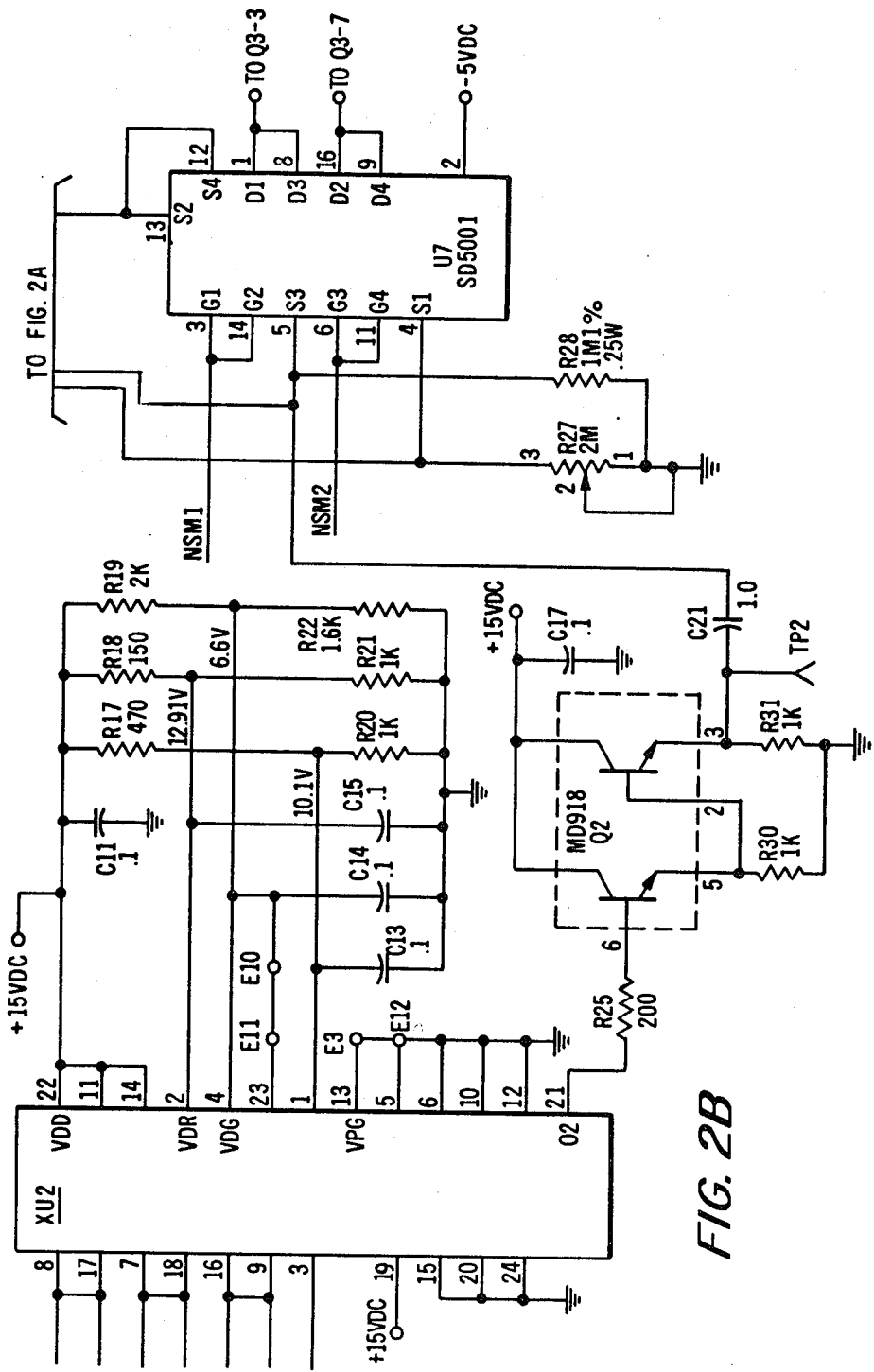
Figure 3:
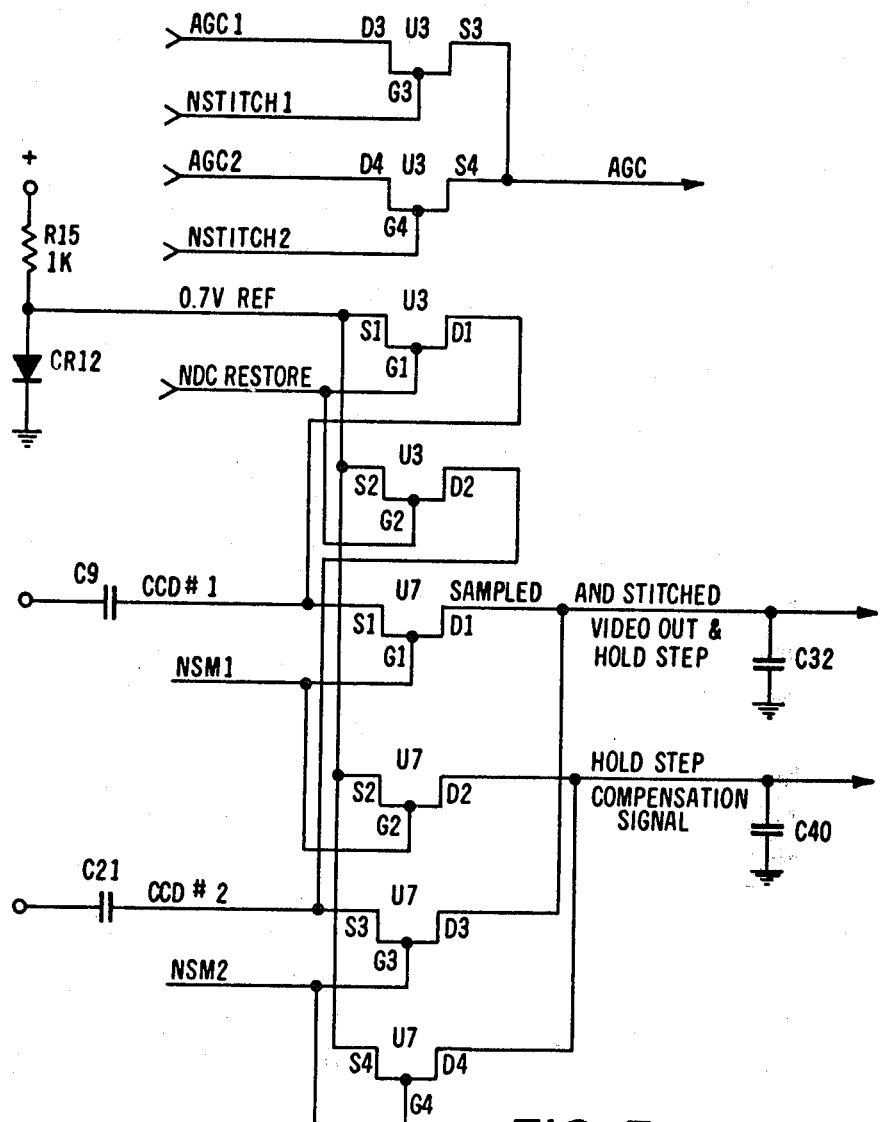
FIG. 3 is a detailed circuit diagram of the sample and hold stitcher.
Figure 4A:
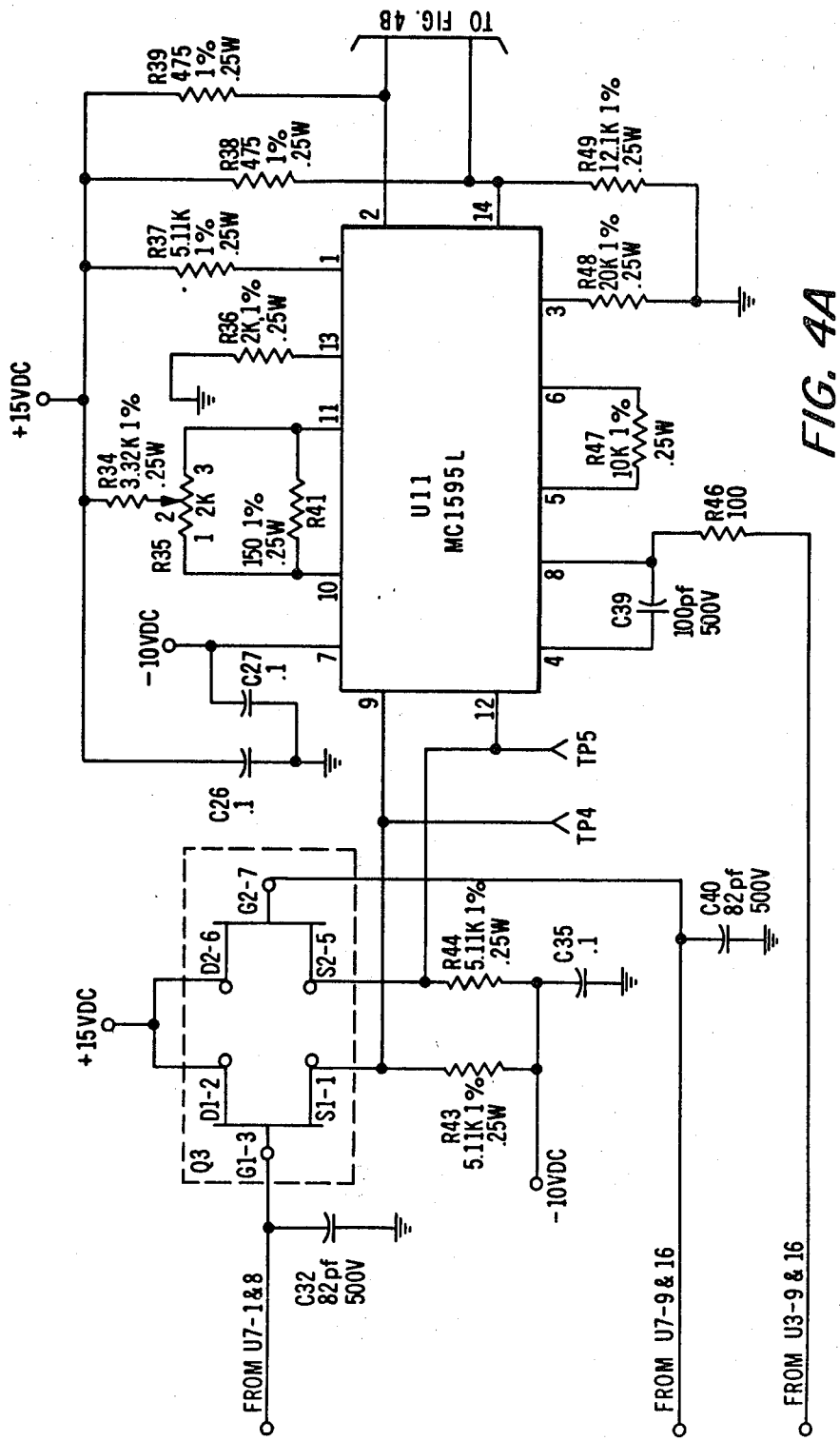
FIG. 4 is a schematic diagram of the differential analog multiplier and final buffers.
Figure 4B:
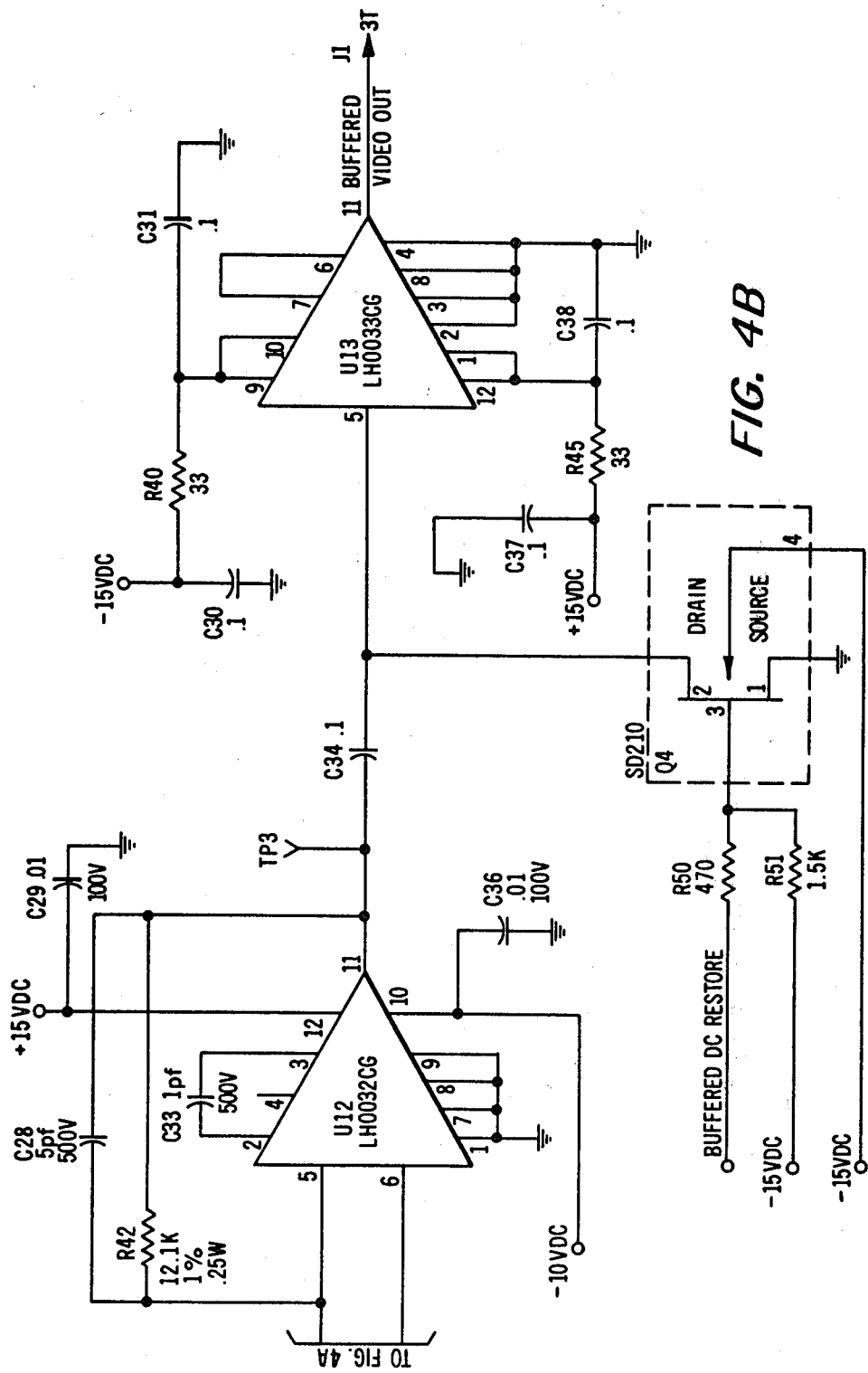

This circuit is shown in more detail in FIGS. 2, 3 and 4. In FIG. 2, each CCD XU1, XU2, a Fairchild 121 H part, scans the light input and produces analog pulse outputs at pin 21. The various capacitors and resistors surrounding these parts are for producing the bias levels required for this application and are described in application notes published by the vendor corporation.

The CCD outputs are applied to current buffers Q1, Q2, part number MD918, each containing two transistors in a package. Both transistors are emitter followers so that voltage gain is less than one, but there is a large current gain. The outputs are then applied through the dc restore circuit which consists of series capacitors C9 and C21, and the SD5001 device U3 gates 1 and 2 which are more fully described in FIG. 3. At the end of each scan line these MOSFETs are pulsed on to charge capacitors C9 and C21. The effective high impedance of this circuit running in a steady state will cause the CCD's output signal to be referenced to the known DC restore level of 0.7 v.

In FIG. 3, the analog video output of CCD #1 is applied through capacitor C9 to the source S1 of device U7. At the same time, a sampling pulse, NSM1, is applied to the G1 gate of U7. The sampling pulse, and therefore the sampling time, is about 20 ns in this application, and occurs during the central portion of the 120 ns CCD output pulse period. The output at the drain D1 of device U7 is a sampled output of the video upon which is superimposed the hold step.

The hold step occurs because of the gate-to-drain capacitance of the transistor and stray capacitances of the circuit paths. That is, the sampling pulse at the gate is coupled through to the drain where it is seen as an unwanted noise step on the sampled analog video signal.

During the second half of the scan, the analog video output from CCD #2 and sampling pulses NSM2 are similarly applied to source S3 and gate G3 of device U7 which is connected to the drain D3 of device U6. Thus, there exists at this junction the stitched outputs of both CCD #1 and CCD #2, but the halves of the scan are not matched in amplitude and both halves contain the hold step.

While the CCD's analog video is being sampled, a hold step compensation signal is similarly generated by applying the sampling pulses NSM1 and NSM2 to the gates G2 and G4 of device U7 while the sources S2 and S4 are connected to a ±0.7 volt dc level. Then, at the connected drains D2 and D4, a hold step compensation signal is produced by sampling the ±0.7 volt dc level.

In FIG. 3, the ±0.7 volt dc reference was produced across a forward biased diode CR12 and is applied to the S2 and S4 inputs of U7 as described above. It is also applied to pins S1 and S2 of device U3. Signal NDC Restore at G1 and G2 of U6 goes high at the end of each scan, restoring the CCD#1 and CCD#2 lines to a ±0.7 volt dc. As shown in FIG. 2, these lines are connected to the right sides of C9 and C21. Therefore, these capacitors are charged to about 4.9 volts between scans.

The video output at the D1 output of U7 and the hold step compensation signal at the D2 output of U7 are amplified at duel FET package Q3 of FIG. 4, a 2N5564 device. These current amplified signals are then applied to the U11 package of FIG. 4, an MC1595 device. This current amplification is necessary because the capacitors C32 and C40 are the hold capacitors of the previous sampling circuits, and current leakage or signal degradation would result if these devices were used to drive the circuit of device U11 directly.

An additional input to the device U11 of FIG. 4 is the automatic gain control (AGC) signal which is generated in device U3 of FIG. 3. As shown in FIG. 3, an AGC voltage adjustment for each channel, AGC1 and AGC2, are applied to the drains D3 and D4 of device U3 while stitching signals N Stitch 1 and N Stitch 2 are applied to the gates G3 and G4. The former is high while CCD#1 is on and the latter is high when CCD#2 is on, so that the composite AGC output is a bi-level voltage output.

Each input, ACG1 and AGC2 is calibrated by placing a target of known gray scale density on the copier platen and adjusting said input for a predetermined voltage at the output of the circuit of FIG. 4.

This bi-level AGC voltage, plus the video and hold step signals which were amplified in transistor package Q3 of FIG. 4, are applied to device U11 of FIG. 4 which is an MC1595 linear analog multiplier. In this circuit, which is fully described in vendor specification sheets, first the sampled video and hold step compensation signals are differentiated to remove the hold step from the video; then this resultant video signal is multiplied by the composite AGC input signal to match the two video levels. The output is next amplified by a voltage factor of 2 in operational amplifier U12, an LH0032 device, and applied to a second dc restoration circuit which consists of capacitor C34 and transistor Q4, an SD210 FET, to restore the dc level to zero volts. The source of Q4 is grounded so that, between scans when the Buffered DC Restore input goes high, the right side of C34 will be grounded. Finally, amplifier U13, a LH0033 current buffer, supplies the power required to drive the video through a 50 ohm transmission line to the analog to digital converter.

The circuit described herein performs most of its functions, including stitching and balancing, at low voltages, and therefore can perform at high data rates using a minimum of parts.

While the invention has been described with reference to its preferred embodiment, it will be understood by those skilled in the art that various changes may be made and equivalents may be substituted for elements thereof without departing from the true spirit and scope of the invention. Further, many modifications may be made to adapt particular situations or materials to the teaching of the invention without departing from its essential teachings.

What is claimed is:

1. A video processor for stitching and matching two low level analog video signals comprising one channel for each signal, each channel comprising:
    a first current buffer for lowering the impedance of each of said analog video signals,
    a dc restorer for replacing the dc component of the output of said first current buffer with a predetermined dc level,
    a video sampling circuit responsive to a sampling pulse for sampling and holding the output of said dc restorer,
    a hold step circuit responsive to said sampling pulse for sampling and holding a reference voltage,
    said video processor further comprising a first summing junction for stitching the outputs of said video sampling circuits,
    a second summing junction for stitching the outputs of said hold step circuits,
    a second current buffer for lowering the impedance of said first summing junction output,
    a third current buffer for lowering the impedance of said second summing junction output,
    a third summing junction for subtracting the outputs of said second and third current buffers, and
    a variable gain means for amplifying the output of said third summing junction using one gain factor for the portion of the stitched video which originated in one channel and a second gain factor for the portion of the stitched video which originated in the other channel to match the amplitudes of the two sets of video signals at said variable gain means output.

2. The video processor of claim 1 wherein each of said video sampling circuits and hold step circuits comprises a sample and hold transistor which uses said sampling pulse to drive said sample and hold transistor to conduct, thereby coupling the signal at said transistor input to said transistor output, and
    hold capacitors at the outputs of said transistor.

3. The video processor of claim 2 wherein said transistors are matched field effect transistors mounted in one package on a single substrate.

4. The video processor of claim 3 wherein said variable gain means comprises:
    a first AGC transistor for coupling a first variable video gain voltage which is used to adjust the analog signal of one channel,
    a second AGC transistor for coupling a second variable video gain voltage which is used to adjust the analog signal of the other channel, and
    a variable gain amplifier, the gain controlled by either said first or second AGC transistor output, for amplifying said third summing junction output.

5. The video processor of claim 4 wherein the sources of said two video analog signals are two CCD arrays.

6. The video processor of claim 5 further comprising a single analog to digital converter for converting the analog output of said variable gain amplifier into digital form.

7. A method of stitching and matching the analog video signals of two CCD arrays comprising the steps of:
    current amplifying each said of analog video signals,
    first dc restoring each set of analog video signals to a predetermined voltage,
    first using sampling pulses to sample and hold both sets of analog video signals to produce two sets of stitched sampled video and hold step signals, combining both sets of signals,
second using said sampling pulses to sample and hold a known dc level to produce hold step signals,
subtracting the hold step signals produced by said second using step from the signals produced by said first using step, and
multiplying the signal produced by said subtracting step with a composite bi-level automatic gain control signal which matches the amplitude of the two sets of video signals.

8. The method of claim 7 further comprising the step of second dc restoring the result of said multiplying step to a predetermined dc level.

9. The method of claim 8 further comprising the step of converting the result of said second dc restoring step into digital form.